United States Patent [19]
Shannon et al.

[11] Patent Number: 6,032,044
[45] Date of Patent: Feb. 29, 2000

[54] CELLULAR COMMUNICATIONS SYSTEM WITH SCREENING OF UNAUTHORIZED SERVICES

[75] Inventors: John Parker Shannon, Dunrobin; John Paul Prokopenko, Ontario; Pradip Sheth, Quebec, all of Canada; Jane Dellipianni; Gerald Feeney, both of Berks, United Kingdom; Hock Gan, Hertfordshire, United Kingdom; Robert Edward Lucas; Lawrence Simpson, both of Berks, United Kingdom

[73] Assignee: Nortel Networks Corporation, Montreal, Canada

[21] Appl. No.: 09/011,911

[22] PCT Filed: Aug. 16, 1996

[86] PCT No.: PCT/GB96/02001

§ 371 Date: Apr. 20, 1998

§ 102(e) Date: Apr. 20, 1998

[87] PCT Pub. No.: WO97/07641

PCT Pub. Date: Feb. 27, 1997

[30] Foreign Application Priority Data

Aug. 19, 1995 [GB] United Kingdom .................... 9517035

[51] Int. Cl.[7] .............................. H04Q 7/20; H04M 3/42
[52] U.S. Cl. ......................... 455/433; 455/432; 455/414
[58] Field of Search ................................... 455/433, 414, 455/435, 432, 403, 422

[56] References Cited

U.S. PATENT DOCUMENTS

| | | | |
|---|---|---|---|
| 4,901,340 | 2/1990 | Parker et al. | 455/432 |
| 5,142,654 | 8/1992 | Sonberg et al. | 455/433 |
| 5,428,665 | 6/1995 | Lantto | 455/414 |
| 5,497,412 | 3/1996 | Lannen et al. | 455/432 |
| 5,504,804 | 4/1996 | Widmark et al. | 455/414 |
| 5,590,175 | 12/1996 | Gallant et al. | 455/433 |
| 5,613,213 | 3/1997 | Naddell | 455/414 |
| 5,752,188 | 5/1998 | Astrom et al. | 455/433 |
| 5,781,858 | 7/1998 | Lantto et al. | 455/433 |

*Primary Examiner*—Dwayne D. Bost
*Assistant Examiner*—Tracy M. Legree
*Attorney, Agent, or Firm*—Lee, Mann, Smith, McWilliams, Sweeney & Ohlson

[57] ABSTRACT

In a cellular communications system comprising a plurality of zones, details of authorized services for each mobile terminal are stored at a central register. The central register is accessed on entry of a visiting mobile terminal into that zone whereby to retrieve the service details for that mobile, the retrieved details are stored at a local register and compared with a set of services capable of being supported within the zone, and providing to the terminal information relating only to those services that are both authorized for use by the terminal and capable of support within the zone. In a preferred embodiment, information relating to a service which cannot be supported in a particular zone is not forwarded to the local register thus avoiding message rejection by the local register.

10 Claims, 5 Drawing Sheets

CELLULAR COMMUNICATIONS SYSTEM WITH SCREENING OF UNAUTHORIZED SERVICES

This invention relates to cellular communications systems and in particular to the provision and control of roaming facilities in such systems.

BACKGROUND OF THE INVENTION

A number of cellular communications systems are currently being introduced. In Europe an operating standard known as GSM has been set up to define protocols, services and operating equipment.

The GSM Standard has been established as a means of realising a pan-European digital wireless telephony network, operating according to the set of ETSI specified protocols known as the GSM recommendations. The primary purposes of these recommendations is to provide a wireless telephony service to subscribers who are free to roam and use the same mobile equipment and one reachable by the same telephone number anywhere within the operating area. This may comprise a number of different networks within the same country, and even in a number of different countries, while subscribers receive a base level of service independent of their location. The recommendations define a GSM network to consist of a number of different types of functional elements, which may be variously combined in an indeterminate number to form a Public Land Mobile Network (PLMN). Within a given country there may be more than one PLMN, and a number of countries are signatory to a memorandum of understanding (the GSM MoU) which requires them to license and make available GSM telephony service which is interoperable with the GSM telephony services provided by the other signatory countries.

The principle telephony components of the GSM network are the home location register (HLR), mobile services switching centre (MSC), the visitor location register (VLR), the base-station controller (BSC), base transceiver stations (BTS), and finally the mobile equipment (ME) plus a subscriber identity module (SIM) which together define a mobile Network (PSTN) and to other PLMNs through an interface function known as the gateway MSC (GMSC). Other functional components exist to provide administration and maintenance of the network. While individual components are allowably realised in combination, (examples being the combination of VLR and MSC functionality in the same network element, or the MSC and GMSC functionality in the same network element) in usual practice a plurality of network elements are deployed in geographically separated locations in order to provide effective physical radio coverage of the network territory. Communication between network elements is usually accomplished by a known messaging protocol based on the CCS No 7 signalling system.

Each country signatory to the GSM standard has licensed (or has plans to do so) one or more PLMNs. Each of these PLMNs is separately licensed and regulated according to the constitutional and national laws relating to telecommunications within that country. Due to commercial and competitive pressures, it is usual for PLMNs within the same country to offer different services and functionality in order to attract and keep the loyalty of their customer base (mobile subscribers). It is also competitively advantageous for PLMNs to secure the widest range of interworking agreements between other PLMNs, especially in other countries, thereby allowing their own subscribers access to a high degree of mobility.

Due to competition within the telecommunications industry, there are multiple vendors for each of the various network elements. These vendors differentiate themselves not only on the basis of territorial presence, reputation and price, but also on the basis of differential functionality. As a consequence, differentiation between PLMNs within the same country is in many cases accomplished through using equipment procured from different manufacturers. It is also usual practice for a given network operator to procure equipment from more than one supplier, in order to maximise competitive pressures upon the suppliers by avoiding monopoly supply situations. As a consequence of the combined pressure of multiple supply situations, and the desire to maximise roaming potential, interworking between equipment manufactured by various vendors across various legal, geographic and national boundaries is imperative. Roaming from one network into another is described for example in specification U.S. Pat. No. 5,329,574. A discription of a method of managing supplementary services in a mobile system is given in specification No WO-A1-94/10814. Specification NL9301493A relates to verification of access rights in a mobile network.

Several fundamental problems are inherent in such a distributed multi-vendor multi-operator architecture, which the introduction of the GSM recommendations as a "standard" is intended to resolve. However, adherence only to standardised implementation by all manufacturers is in direct conflict with competitive pressures, and in some cases with regulatory requirements. As a consequence, various differential realisations of GSM functionality above and beyond the basic standards known as GSM are a fact of the business, and introduce several issues related to operations, administration, maintenance and procedures which have commercial impact not only towards cost of ownership, but also towards manufacturability.

Although the GSM recommendations describe comprehensive functionality, they permit differential implementations in recognition of the need for competitive differentiation between manufacturers: it is common in practice for manufacturers to differentiate their products through the addition of proprietary extensions, the facility for which is included in the inter-element message protocols. Given the nature of proprietary extensions and that they arise as a consequence of commercial pressure, it is likely that different manufacturers will independently implement similar functionality for different customer's and subsequently leverage this additional functionality as commercially advantageous to other customers. It is highly unlikely that the different manufacturers will use identical message protocols. Since network operators commonly procure equipment from more than one supplier, they require functionality between manufacturers' equipment to be available to their mobile subscribers as conditions of supply. Even without dual suppliers within the same network, inter-PLMN roaming agreements impose similar interoperability pressures on manufacturers. Finally, to maximise competitive advantage within a country, the same manufacturer may be required to supply functionality to one PLMN not available to the other PLMN. As a consequence of these commercial pressures, it is highly likely that two different manufacturers would be frequently in the position of having to supply similar functionality with differential implementations, which implementations must interwork together, and simultaneously supply differential functionality which must be prevented from interworking with that of their own or other manufacturers' equipment. The manufacturers must therefore find a mechanism to control interworking of differential functionality between each other's equipment such that unexpected interactions do not occur. Since it is also highly likely that independent manufacturers introduce proprietary functionality independently at different times, a flexible means of controlling differential functionality is of joint commercial advantage to both manufacturers (they can introduce equipment that might not otherwise behave in a deterministic manner) and network operators (they can control appearance of differential functionality within the network).

The various geographically distributed network elements must work together to provide each instance of a mobile subscriber's service. For example, an incoming call to a mobile subscriber requires functionality resident in the MSC, VLR, HLR, BSC, BTS, ME and MS at various stages of establishing the call. Delivering service in this environment implies that all nodes must be able to interact with their neighbours, which neighbours may be in different PLMNs and indeed in different countries. However, the service set is continuously being revised, and inconsistencies between the various network elements are unavoidable or, when avoidable, impose significant operational complexity on the network operators and equipment manufacturers alike. There is a real need to maintain compatibility between network elements firstly between networks, but also within the same network, even between equipment provided by the same manufacturer but which equipment may be at different functional release levels. It is practically impossible and wholly undesirable to simultaneously upgrade all of the network elements in all of the networks in the world simultaneously. It must therefore be recognised that transient situations will continuously appear during which differential services may exist in the network as a consequence of network upgrades occurring world-wide, exacerbated by the presence of inter-PLMN roaming agreements. It is commercially desirable that a network operator can "roll out" new services throughout the network as they become available, rather than have to wait for the network to be fully upgraded, as this increases the velocity by which new revenue generating services can be made available to subscribers. It is therefore advantageous to be able to permit differential exchange of messages between two network elements depending on their ability to interpret the information. Similarly, there is an issue of compatibility between various national networks, where regulatory or legal constraints may restrict identically implemented and otherwise "standard" services such as calling line presentation. Thus, services normally available to a given MS, and known and available as part of the functionality which could be deployed, must be restricted from use.

In addition, it is commercially advantageous for a network operator to offer differential grades of service, perhaps at premium prices, which restrict services which are otherwise semantically and syntactically embedded in the fundamental service definition. The simplest example of this in GSM is the ability to offer a "basic" roaming service to customers who would be restricted from operating their mobile phones outside the home PLMM, and offering increasing roaming capability as a premium service for additional revenue.

The object of the invention is to minimise or to overcome the above disadvantages.

SUMMARY OF THE INVENTION

According to the invention there is provided a method of screening of services made available locally to visiting mobile terminals in a zone of a cellular communications system, the method including determining for a said visiting terminal on entry to the zone the set of services to be allocated locally to that terminal, and providing to that terminal information relating to those services only.

According to the invention there is further provided a method of screening of services made available locally to visiting mobile terminals in a zone in a cellular communications system comprising a plurality of zones, the method including storing details of authorised services for each mobile terminal at a central register, accessing said central register on entry of a visiting mobile terminal into that zone whereby to retrieve the service details for that mobile, storing said retrieved details at a local register, comparing the stored details at the local register with a set of services capable of being supported within the zone, and providing to the terminal information relating only to those services that are both authorised for use by the terminal and capaple of support within the zone.

According to another aspect of the invention there is provided a cellular communications system comprising a plurality of zones in each of which mobile terminals may make calls and access services, wherein each mobile terminal is allocated to a respective zone and may enter other zones as a visitor, the system incorporating a central register containing details of authorised services for each mobile terminal, and local registers one for each said zone for storing information relating to mobile terminals entering that zone as visitors, wherein each said local register has means for accessing said central register on entry of a visiting mobile terminal into that zone whereby to retrieve the service details for that mobile terminal, means for comparing the stored details at the local register with a set of services capable of being supported within the zone, and means for providing to the terminal information relating only to those services that are both authorised for use by the terminal and capaple of support within the zone.

The screening method embodies a set of data structures to define and maintain context information, and an algorithm whereby this information is updated and evaluated thereby to provide or exclude services based on the ability of the network components involved in the instance of the transaction to realise these services (which may change from transaction to transaction); to accommodate differential implementations of similar services, for example by different manufacturers or during equipment upgrades within a network, on a per-service instance, per transaction basis, and to provide or restrict functionality based on context such as but not limited to physical location or purchased grade of service, also on a per-service instance, per transaction basis. On the instance of a transaction being initiated against a service instance, and as one of the first operations performed, the context applicable to the service instance is retrieved. Subsequent processing of the transaction occurs in conjunction with the context, including if necessary modification of the context information. The context information is then used to select differential treatment of the transaction which includes but is not limited to modifying data held elsewhere against the service instance, applying differential operational algorithms, suppressing "optional" components of subsequent dialogues to other network elements involved in the transaction, and either semantically or syntactically modifying the contents of messages to such other nodes. On conclusion of the transaction, or at applicable points within the transaction, if the context has been modified, the updated context information is stored against the service instance so as to be available and applicable to future transactions which might occur. This context information augments the information normally specified to beheld against individual service instances.

In a preferred embodiment, data structures are defined which allow operators of the equipment to select against each of the parameters which determine the context (for example subscriber location) the conditions of evaluation of the context, through a set of parameterised actions which can be accommodated (allow or reject transaction, and optionally: suppress, activate or modify normally held data elements or inter-element message components). In order to provide simplified administration, an overall set of limits is provided which allows the manufacturer to limit the capabilities which the equipment appears to be able to perform, and a default which provides the baseline treatment in the absence of operator modifications to the system (initially conforming exactly to the specifications of the basic service). Through such a mechanism, the equipment vendor can implement a service tailorable to multiple markets or customers while developing, maintaining and enhancing a single core product which interworks in a deterministic manner through network upgrades, enhancements and in conjunction with the equipment of competitors. This increases the ease and velocity of new service introduction, and decreases interworking barriers which might otherwise preclude or delay the manufacturer's presence as a second or third supplier in a multi-vendor network. The equipment operator thus has the advantage of control over the capabilities of the equipment as it interacts with other equipment either within his own network, spanning network, national and trans-national boundaries.

The screening mechanism allows a home location register to work with visitor location registers (VLRs) supporting diferent sets of services, and overcomes the problem of ISD/DSD message rejection by a VLR where a mesage contains data that the VLR does not recognise. The mechanism ensures that each ISD/DSD mesage is accepted by never sending data relating to services which that particular VLR does not support. This is effected by associating a set of screening data with a range of VLRs. This screening data takes one of the following three forms.

Y—The service is supported by the VLR and data will be sent.

N—The service is not supported the VLR and data relating to that service will be filtered out.

D—The service is not supported the VLR and a subscriber with this service is to be denied roaming.

BRIEF DESCRIPTION OF THE DRAWINGS

An embodiment of the invention will now be described with reference to the accompanying drawings in which.

DESCRIPTION OF PREFERRED EMBODIMENT

Figure 1:
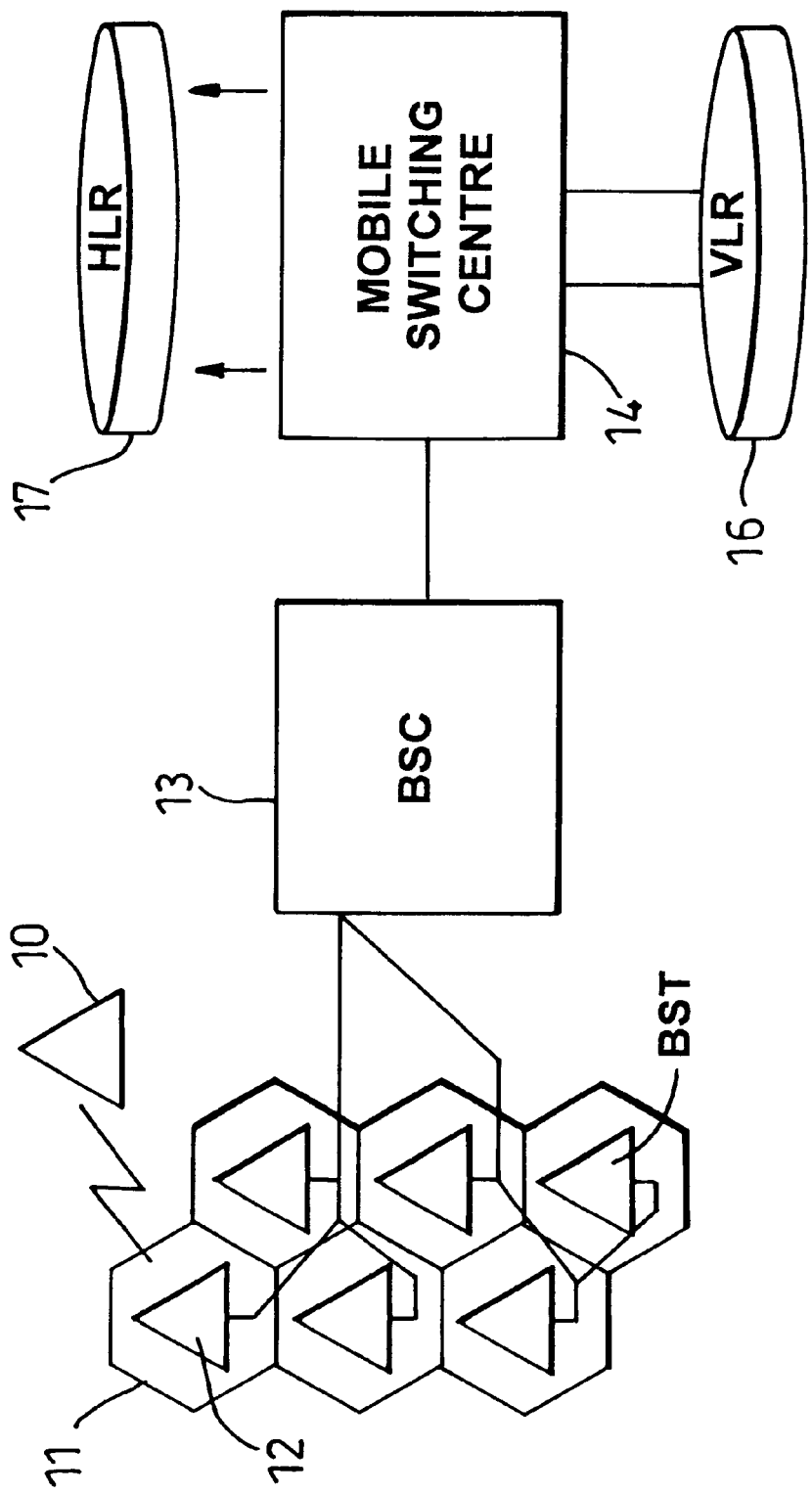
FIG. 1 is a highly schematic diagram of a cellular communications system comprising a number of networks.

The communications system includes a number of networks each as shown in FIG. 1 comprising a plurality of cells (11). Each network includes a home location register (HLR) (17) containing a master copy of information relating to mobile terminals (10) registered with that network, and one or more visitors location registers (VLR) (16) each serving a zone within the network and which contain inter alia information on mobiles which have entered that zone. Mobiles may enter a zone either from another network zone or from another network. It will be appreciated that the various networks may be operated by different operators and that, although they will all conform to one broad system standard, certain special services may be network specific. Thus, a particular network may be unable to support certain services that are normally enjoyed by a mobile registered in another network which does support those services. Even within one network, some services may be available only on a local basis e.g. as a result of differing equipment manufacture.

When a mobile enters a zone served by a visitors location register, a data message, which includes inter alia details of the mobile's service entitlement, is sent to the visitors location register from the home location register of that mobile. The home location register holds details of all the system visitors location registers and, prior to sending information relating to the service entitlement, removes or screens out details of any services which that particular visitors location register (or the network containing the visitors location register) does not support and/or services to which the mobile is to be denied access in that zone. In some applications the mobile may not be entitled to any services in a particular network or zone and will then be subject to a roaming restriction. To meet these requirements we have defined a roaming restriction and a service screening function.

Roaming restrictions comprise:
  a mapping from VLR number onto an administration defined VLR Zone;
  comparison of the VLR Zone with a subscriber's data-filled Roaming Restriction Level;
  allowing or disallowing roaming accordingly.

This function is modified to allow the HPLMN administrator to control roaming on a per-subscriber basis to specified sets of PLMNs.

Service screening comprises a mapping from VLR number on to an enhanced set of service-restrictions and identifying those services which:
  the VLR does not support and which therefore necessitates the subscriber being prevented from roaming;
  the VLR does not support, but which do not prevent roaming. A subscriber with these services is allowed to roam but the services are not supported while he or she is at the respective VLR;
  in the case of CW, the protocol variant supported at the VLR.

This function allows the HPLMN administrator to control the level of new services provided to subscribers in the presence of differing inter-PLMN roaming agreements, network service capabilities, and regulatory requirements.

Additionally it allows controlled introduction and verification of new services in trial areas without requiring universal support throughout the network.

The home location register applies the administration defined roaming restriction and service screening rules in order to control the roaming of the mobile subscriber and the services which are subsequently available to that subscriber.

Figure 2:
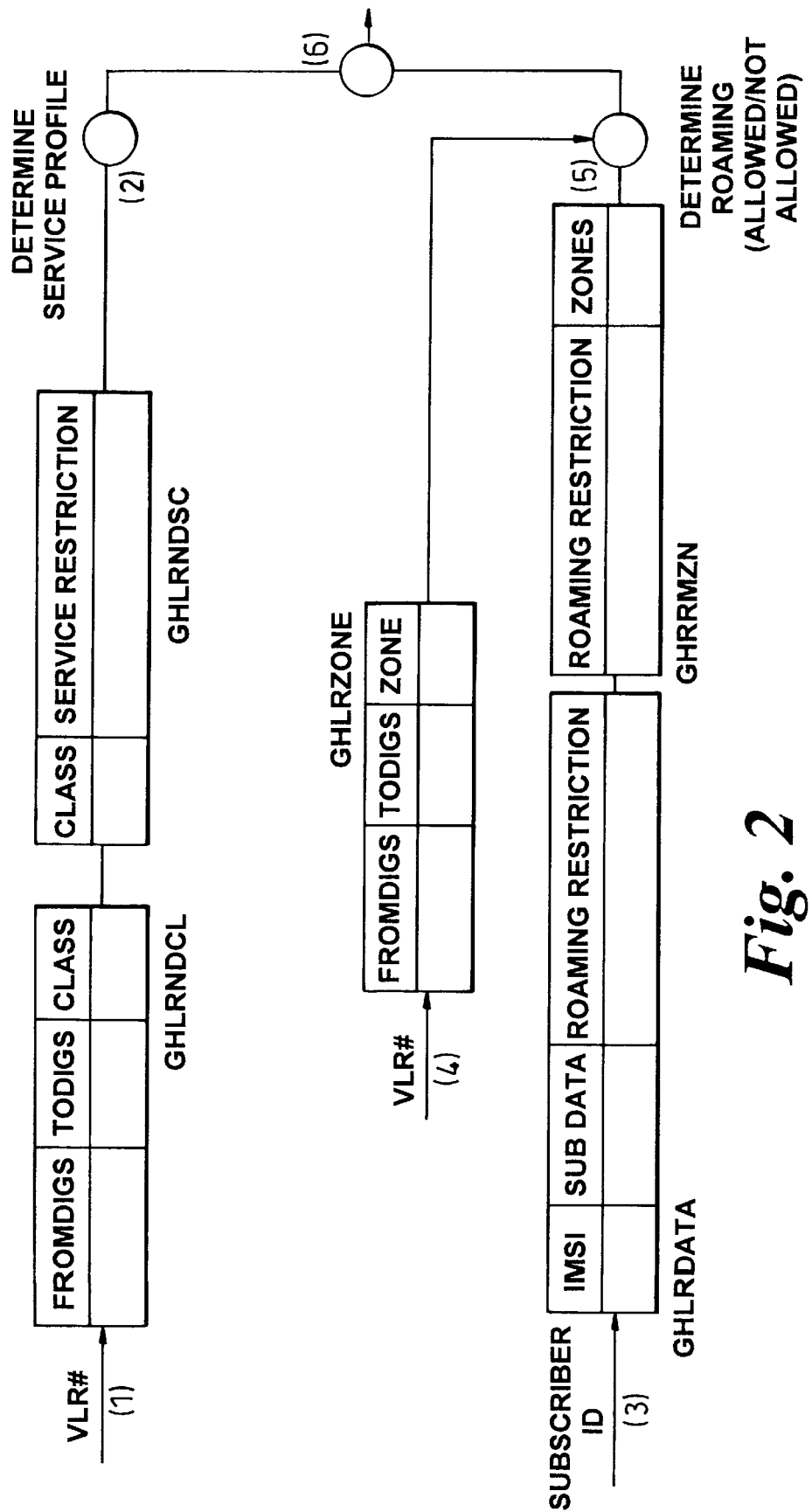
FIG. 2 illustrates the manner in which data is organised and collated in a home location register (HLR) to support service screening and roaming restriction in the system of FIG. 1.

The framework provided by this activity for the definition of VLR zones is based on the following restrictions:
  single VLRs do not provide service to more than one PLMN single PLMNs do not provide service to more than one country The data relationships for roaming restriction and service screening are illustrated in FIG. 2.

Roaming Restriction

VLRs are assigned a VLR Zone in a new 'zone' table, GHLRZONE. A VLR Zone is assigned to a PLMN in a new 'PLMN' table GHLRPLMN, which allows one zone per PLMN. Each subscriber is assigned a Roaming Restriction Level in the existing table GHLRDATA. A new table GHLRRMZN is implemented by this activity to provide a mapping from Roaming Restriction to one or more VLR Zones. The VLR Zones that the Roaming Restriction maps onto are those to which the subscriber is entitled to roam.

Administration is responsible for correctly defining:

the subscriber's Roaming Restriction Level (GHLRDATA);

the VLR range to be assigned to a VLR Zones (GHLRZONE);

the PLMN in which a VLR Zone resides (GHLRPLMN);

the mapping from Roaming Restriction to a set of VLR Zones (GHLRRMZN).

Service Screening

Each VLR, or group of VLRs, is assigned a Node Class in table GHLRNDCL. The Node Class is used to index screening table GHLRNDSC which contains screening information for the class. This class screening information comprises the required treatment for each service that is supported at the HLR. The required treatments for each service are assigned according to whether the VLR supports the service, and are defined as follows:

allow subscriber to roam with service;

allow subscriber to roam but withhold service;

deny roaming;

in the case of CW, identify the protocol variant supported.

The service treatments are therefore defined according to the consequences of non support by the VLR in question. For example, if a particular VLR does not support a proprietary service, then the required action may be to allow the subscriber to roam but withhold the service. However, if the VLR does not support a proprietary service "Local Calls Only", then the required action might be to deny roaming to that area for subscribers with LCO.

The service treatments for the VLR class are evaluated against the subscriber service profile in table GHLRSSOP, in order to determine whether the subscriber is allowed to roam and the level of service support.

The VLR Node Class (GHLRNDCL) and the VLR class attributes (GHLRNDSC) are configured by the administration.

Roaming restriction is implemented through the new tables, GHLRZONE, GHLRRMZN, GHLRPLMN and existing table GHLRDATA. These tables provide the following functionality:

Table GHLRPLMN provides a mapping from VLR Zone to PLMN. This table imposes the restriction that only one VLR Zone can be mapped to a PLMN. VLR Zones must be defined in this table prior to being assigned to tables GLHRZONE and GHLRRMZN;

Table GLHRZONE provides a mapping from VLR number to administration defined VLR Zone, where a VLR Zone denotes an entire PLMN;

The previous VLR Zone value of "UNKW" (unknown) is renamed "NOROAM" by this activity and implies that roaming into VLRs of this zone is prohibited for all subscribers. This table provides the underlying mechanism to support fragmentation of PLMNs in subsequent releases.

The GLHRDATA contains a Roaming Restriction Level for each subscriber. Each subscriber must have a Roaming Restriction Level, which may or may not be unique to that subscriber. The default Roaming Restriction Level of "UNKW" (unknown) implies that subscribers with this entitlement are permitted unrestricted roaming.

Table GLHRRMZN provides a mapping Roaming Restriction to VLR Zone. Roaming is permitted if the Roaming Restriction of the subscriber includes a mapping to the VLR Zone of the VLR. A particular Roaming Restriction can be configured to provide eligibility to roam to one or more VLR Zones. Similarly, a VLR Zone can be configured as an element of one or more Roaming Restrictions.

Roaming Restrictions, VLR Zones and PLMNs are initially defined in the existing table GHLRSCMP. This table contains a name, qualifier and associated textual description for each of the above parameters. Each parameter must be defined in this table prior to being assigned to GHLRDATA, GLHRZONE, GHLRRMZN and GHLRRPLMN.

A default VLR Zone "ZONEDEFAULT" is defined in GHLRPARM for use whenever the HLR has to deal with a VLR for which there is not datafill present in GLHRZONE. The ZONEDEFAULT is initialised to "INITIALZONE" and is thereafter configurable by the administration.

In the process illustrated in FIG. 2, the VLR number is used to index table GHLRNDCL which provides the Node Class. The Node Class is used to index table GHLRNDSC which provides the Service Restrictions. Service Restrictions and the subscribers service profile (from GHLRSSOP) are applied to identify screen services and determine if the service profile prevents the subscriber roaming. The subscriber IMSI is used to access table GHLRDATA to obtain the subscriber Roaming Restriction Level. The VLR number is used to index table GLHRZONE to retrieve the Zone. Zone is applied to the subscriber Roaming Restriction Level and validated against table GHLRRMZN, to determine whether or not a subscriber is entitled to roam. The subscriber is allowed to roam if service screening and roaming restriction do not deny roaming.

Service screening is implemented through the tables, GHLRNDCL and GHLRNDSC. The functionality provided by these tables is summarised as follows:

Table GHLRNDCL provides a mapping from VLR number to administration defined Node Class. This class can be used to denote PLMNs or parts of PLMNs (in the case of multiple versions of VLR within a single PLMN). Not all discrete instances of VLR number need have an associated Node Class. A given VLR number may be part of a range for which a Node Class is assigned.

Table GHLRNDSC provides a mapping fro Node Class to Service Restrictions, which are applied against each of the screened services.

Three levels of Service Restrictions are supported:

D (Denied): subscribers with this service cannot operate within the VLR, and update location is denied (i.e. roaming not allowed)

N )No service): subscribers with this service are allowed to operate within the VLR, however the service will be inoperative Y (Yes): subscribers with this service are allowed to utilise the service within the VLR.

Node Classes must be defined in table GHLRSCMP prior to being assigned against VLRs in table GHLRNDCL and Service Restriction characteristics in table GHLRNDSC. A default screening class "VLRDEFAULT" is defined for use whenever the HLR has to deal with a VLR for which there is not datafill present in GHLRNSCL or GHLRNDSC.

The ability of a subscriber to roam to a particular VLR is a function of both the roaming restrictions and service screening.

Upon receiving an Update Location operations, the HLR returns the MAP error "RoamingNotAllowed" if the result of the roaming restrictions and services screening function is to deny the subscriber roaming access to that VLR.

Figure 3:
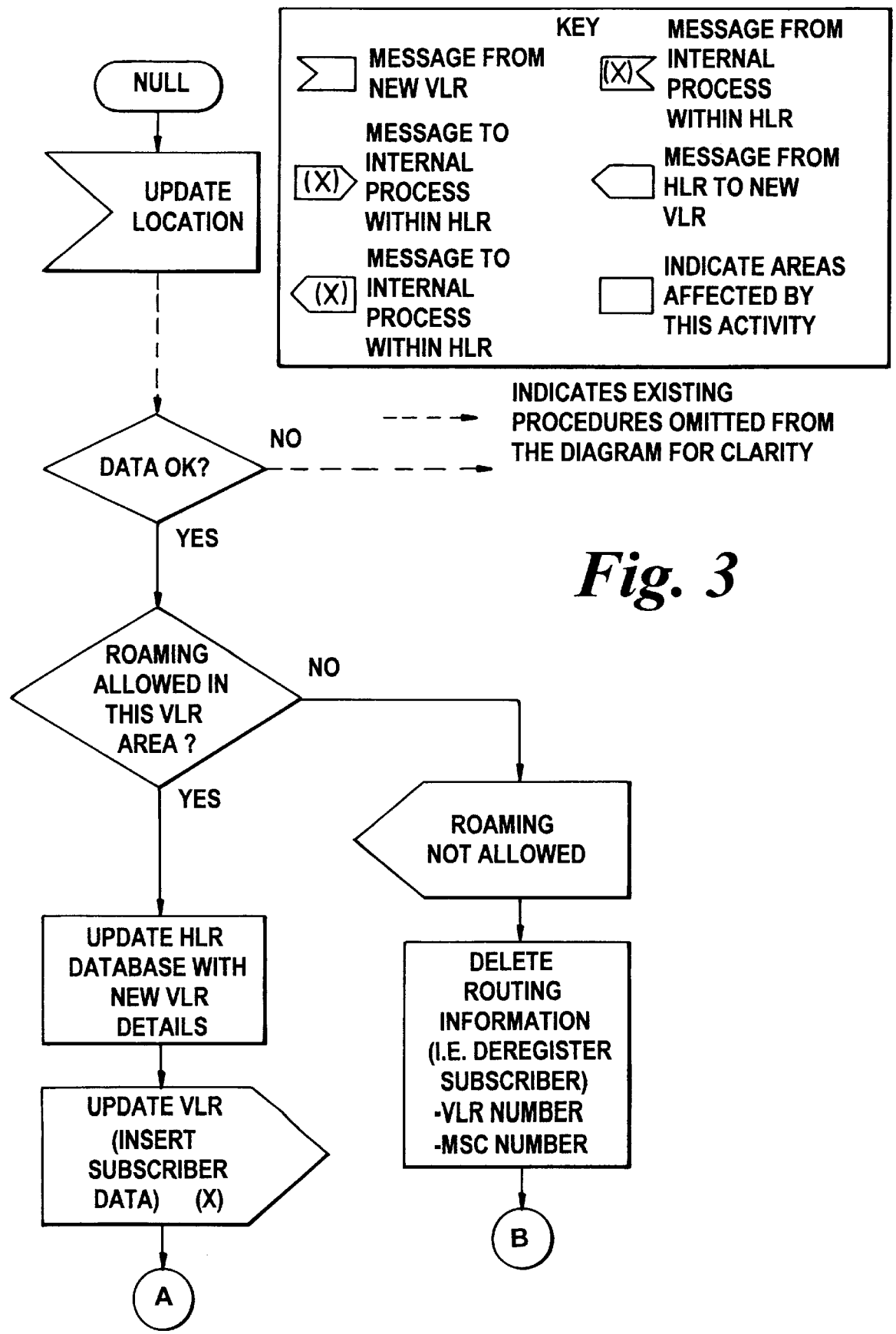
FIG. 3 illustrates a protocol for location updating in the home location register of FIG. 2.
Figure 4:
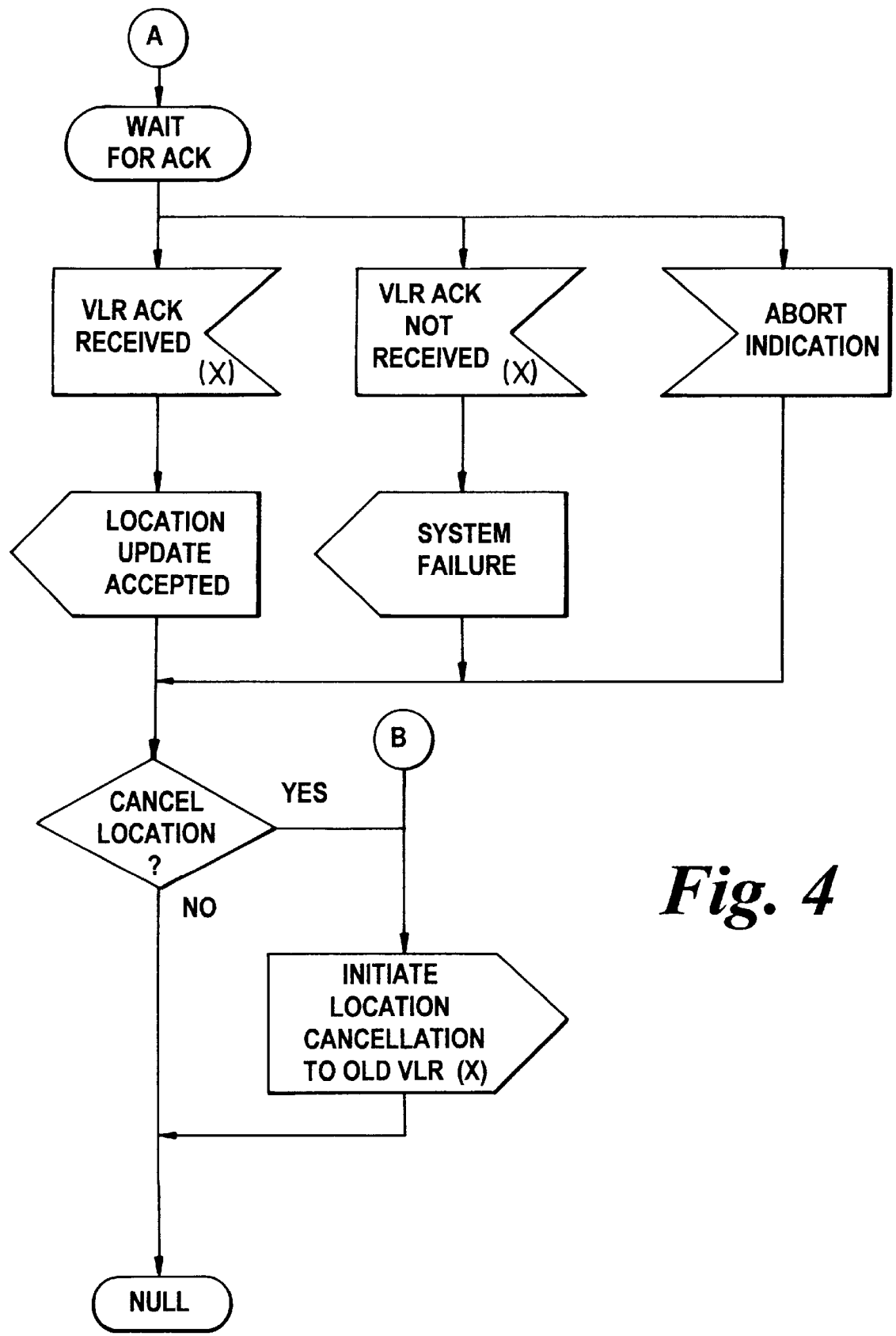
FIG. 4 illustrates a set of message sequences corresponding to the protocol of FIG. 3.
Figure 5:
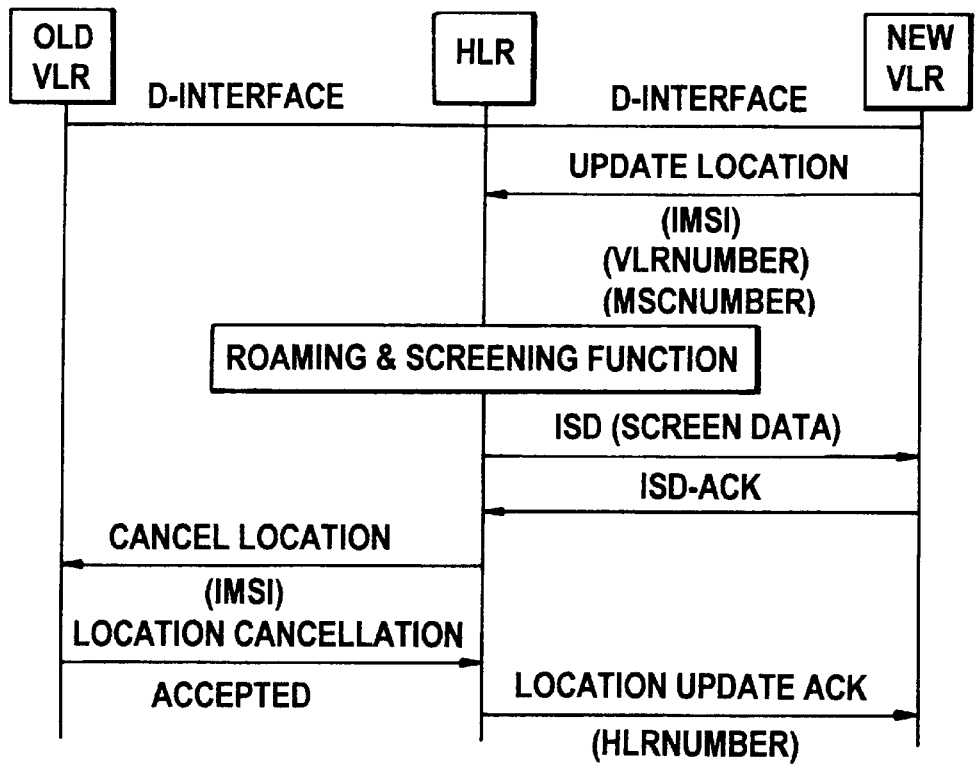
FIGS. 5 and 6 illustrate information flow in the performance of the protocol of FIG. 3.
Figure 6:
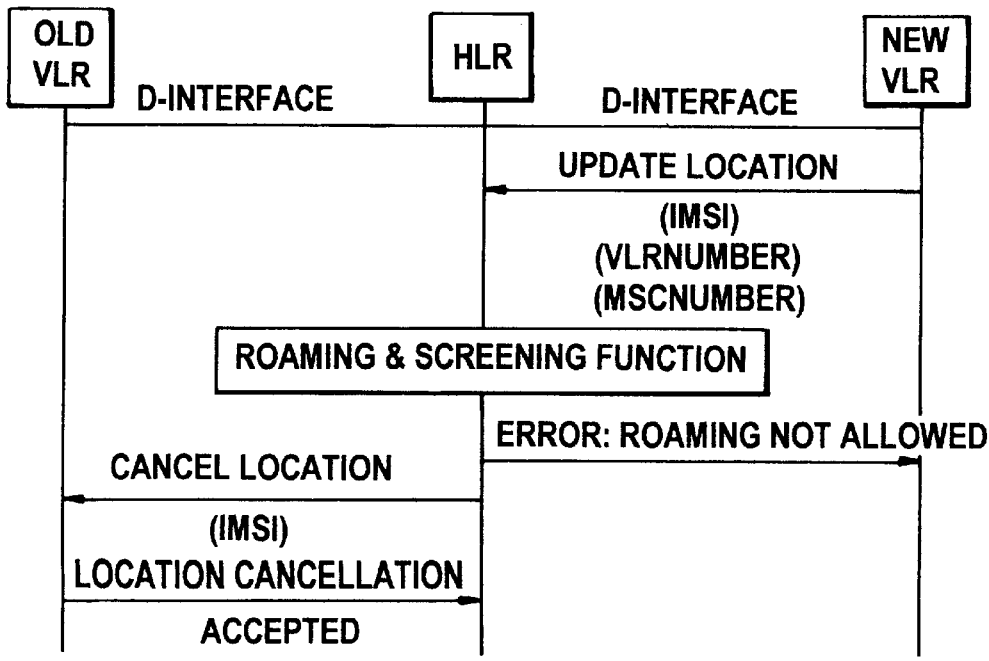

The SDL for the Update Location operation as performed by the HLR to incorporate roaming, is depicted in FIG. 3. The message sequences incorporating roaming at the HLR during Update Location are depicted in the flow chart of FIG. 4 and the flow diagrams of FIGS. 5 and 6 which show the information flow for successful and unsuccsessful location update respectively.

The services that are available to a subscriber when he moves to a new VLR area are evaluated at Update Location. Consequently the subscriber's screened service profile is updated in the new VLR. Changes to the tables governing the rules for permissible services at the VLR may occur after the subscriber has roamed there. The subscriber service profile at the VLR is not updated as a result of changes to the HLR screening tables until the next Update Location. Therefore the HLR provides a mechanism to synchronise the VLRs through initiation of an Update Location. The mechanism used is to send a "HLR Reset" message from the HLR to the VLR. The HLR is not actually reset and no service affecting data is lost. However, on the next contact by the subscriber, the VLR will initiate a Update Location, automatically ensuring all subscribers in the VLR are updated according to the new screening rules.

When a subscriber has been previously prevented from roaming, the mobile set itself can prevent re-attempts to the given VLR. In this case a procedure specific to the implementation of the handset and SIM card must be followed to request the mobile to re-attempt contact with the network.

If the Roaming Restriction Level for a subscriber in table GHLRDATA is modified to restrict roaming to a VLR zone while the subscriber is actually located in that zone, then the HLR initiates a Cancel Location operation for that subscriber to the VLR.

Provision of additional basic or supplementary services, which are screened, results in one of the following courses of action at the HLR:

If the service profile for a subscriber in tables GHLRSSOP or GHLRDATA is modified to provide the subscriber with a service which is supported at the current VLR, then the HLR includes the data for that service in the InsertSubscriberData which is initiated as a consequence of the modification, and in subsequent Insert Subscriber Data messages sent to the supporting VLR. For example, if Alternate Line Services (ALS) is provisioned for a subscriber while he or she is at a VLR which supports that service, then ALS is included in the next ISD.

If the service profile for a subscriber in table GHLRSSOP or GHLRDATA is modified to provide the subscriber with a service which is not supported at the current VLR and which does not prevent the subscriber from roaming to that VLR, then the HLR excludes the data for that service from subsequent Insert Subscriber Data messages sent to the non supporting VLR. For example, if ALS is provisioned for a subscriber while he or she is at a VLR which does not support that service, then ALS is not included in the next ISD.

If the service profile for a subscriber in table GHLRSSOP is modified to provide the subscriber with a service which is not supported at the current VLR and which would have prevented the subscriber from roaming to that VLR, then the HLR initiates a Cancel Location operation for that subscriber to the VLR. For example, if Operator Determined Barring (ODB) is provisioned for a subscriber while he or she is at a VLR which does not support that service, then a Cancel Location is sent to the unsupporting VLR.

It will be understood that although the service screening and roaming restriction technique has been described with particular reference to the GSM mobile system, it is by no means limited to use with that particular system but is of general application to mobile communication systems.

We claim:

1. A method of screening of services made available locally to visiting mobile terminals (10) in a zone in a cellular communications system comprising a plurality of zones, the method including storing details of authorised services for each mobile terminal at a central register (17), accessing said central register on entry of a visiting mobile terminal into that zone whereby to retrieve the service details for that mobile, storing said retrieved details at a local register (16), comparing the stored details at the local register with a set of services capable of being supported within the zone, and providing to the terminal information relating only to those services that are both authorised for use by the terminal and capable of support within the zone, wherein the central register (17) contains information relating to each service authorised for use by a mobile terminal (10), and wherein each local register (16) has means for retrieving from the central register information relating only to those services that are capable of support within the zone.

2. A method as claimed in claim 1, wherein services to which a mobile terminal (10) is entitled are authorised for use by that terminal only in a subset of said zones.

3. A method as claimed in claim 2, wherein a roaming restriction is applied to terminal for which no services are either authorised for use or are supported within the zone.

4. A method as claimed in claim 3, wherein a mapping is provided for each said terminal between the services allocated to that terminal and the services capable of support in each system zone whereby to identify respectively the services capable and incapable of support for that terminal.

5. A method as claimed in claim 4, wherein said mapping further identifies services that are to be denied to a said mobile (10) in zones other than one or more selected zones whereby to effect a roaming restriction in respect of those services.

6. A method as claimed in claim 1, wherein a roaming restriction is applied to terminal for which no services are either authorised for use or are supported within the zone.

7. A method as claimed in claim 1, wherein a mapping is provided for each said terminal between the services allocated to that terminal and the services capable of support in each system zone whereby to identify respectively the services capable and incapable of support for that terminal.

8. A method as claimed in claim 7, wherein said mapping further identifies services that are to be denied to a said mobile (10) in zones other than one or more selected zones whereby to effect a roaming restriction in respect of those services.

9. A cellular communications system comprising a plurality of zones in each of which mobile terminals (10) may make calls and access services, wherein each mobile terminal is allocated to a respective zone and may enter other zones as a visitor, the system incorporating a central register (17) containing details of authorised services for each mobile terminal, and local registers one for each said zone for storing information relating to mobile terminals entering that zone as visitors, wherein each said local register (16) has means for accessing said central register (17) on entry of a visiting mobile terminal (10) into that zone whereby to retrieve the service details for that mobile terminal, means for comparing the stored details at the local register with a set of services capable of being supported within the zone, and means for providing to the terminal information relating only to those services that are both authorised for use by the terminal and capaple of support within the zone.

10. A system as claimed in claim 9, wherein each local register has means for retrieving from the central register information relating only to those services that are capable of support within the zone.

* * * * *